(12) United States Patent
Liu et al.

(10) Patent No.: US 7,268,338 B2
(45) Date of Patent: Sep. 11, 2007

(54) IMAGING ARRAY HAVING VARIABLE CONVERSION GAIN

(75) Inventors: Xinqiao (Chiao) Liu, San Jose, CA (US); Hung Do, San Jose, CA (US)

(73) Assignee: Fairchild Imaging, Milpitas, CA (US)

( * ) Notice: Subject to any disclaimer, the term of this patent is extended or adjusted under 35 U.S.C. 154(b) by 37 days.

(21) Appl. No.: 11/175,948

(22) Filed: Jul. 6, 2005

(65) Prior Publication Data

US 2007/0007438 A1    Jan. 11, 2007

(51) Int. Cl.
*H03F 3/08* (2006.01)

(52) U.S. Cl. ............ 250/214 AG; 250/214 A; 348/300; 330/308

(58) Field of Classification Search ........ 250/214 A, 250/214 AG; 348/300–302; 330/308, 86, 330/114
See application file for complete search history.

(56) References Cited

U.S. PATENT DOCUMENTS 5,892,540 A * 4/1999 Kozlowski et al. ........ 348/300
6,201,573 B1 * 3/2001 Mizuno .................... 348/308
6,339,363 B1 * 1/2002 Fowler .................... 330/308
6,459,078 B1 * 10/2002 Fowler .................... 250/308
6,747,264 B2 * 6/2004 Miida .................. 250/214 AG
2006/0033007 A1 * 2/2006 Terzioglu ................ 250/208.1

* cited by examiner

*Primary Examiner*—Georgia Epps
*Assistant Examiner*—Stephen Yam
(74) *Attorney, Agent, or Firm*—Calvin B. Ward

(57) ABSTRACT

A CCD imaging array and a charge measurement amplifier for use in such imaging arrays is disclosed. The array includes a plurality of pixels that accumulate charge when exposed to light, a readout amplifier having input and output ports. The readout amplifier has a variable gain that is set by a gain control signal. The readout amplifier also includes a reset path between the input and output ports, the path having an impedance controlled by a reset signal. A controller generates the gain control signal and the reset signal during a charge measurement cycle. Initially the gain is set to a first value after generating the reset signal. The gain is changed to a second value during the charge measurement cycle if the output signal exceeds a first threshold value. The readout amplifier can be constructed from an operational amplifier having a capacitive feedback loop.

15 Claims, 8 Drawing Sheets

IMAGING ARRAY HAVING VARIABLE CONVERSION GAIN

BACKGROUND OF THE INVENTION

The present invention may be more easily understood in the context of low light imaging arrays such as those used in digital photography to record an image. For the purposes of this discussion, an image will be defined as a two-dimensional array of digital values that represent the amount of light received during an exposure period at each pixel on a two-dimensional surface onto which the image is projected. For the purposes of this discussion, it will be assumed that each pixel is a small rectangular area on that surface. In digital photography, the image is projected onto an imaging array in which each pixel includes a photodetector that measures the amount of light that falls on some portion of the pixel area.

In one class of imaging array, the detector utilizes an area of silicon to collect electrons that are generated by light that strikes the silicon. During the exposure period, the electrons accumulate in the pixel area. The charge collected in each pixel area is measured at the end of the exposure period by moving the charge to an amplifier and an analog-to-digital converter that provides a digital value for each pixel. The pixels are arranged as a plurality of columns of pixels. Each pixel in a column is part of an analog shift register. The image is readout by shifting the charge collected at each pixel through the shift register until it reaches the end of the column. The charge is then either input to an amplifier or moved to another shift register that finally deposits the charge at the amplifier. Imaging arrays of this type are often referred to as charge-coupled devices (CCDs). CCDs are characterized by large fill factors, since most of the area of each pixel is devoted to generating and storing electrons from the incident light, and hence, such devices have the potential for providing imaging arrays that can operate under low light conditions.

Image arrays that have high dynamic ranges are required for many applications, including conventional photography. The dynamic range of an imaging array will be defined to be the ratio of the maximum signal for a pixel to the minimum signal that is above the noise. Typically, the signal from each pixel is processed in a charge conversion circuit that converts the charge to a voltage that is, in turn, converted to a digital value by an analog-to-digital converter (ADC). In one embodiment, the charge-to-voltage conversion is performed by a capacitive transimpedance amplifier.

At low light levels, the quality of the image is set by the signal-to-noise ratio at each pixel. Hence, a conversion circuit having a low noise and a high gain must be utilized. If this conversion circuit is used to convert signals from pixels having high light intensities, the output voltages will be too high for conventional low cost CMOS circuitry. If, on the other hand, the amplifier gain is set to a low value to maintain the signal within the range of CMOS circuitry when the charge from high intensity pixels is processed, the noise levels of the amplifier will be too high to provide optimum performance for the pixels having small charges.

A high dynamic range imaging array also generates pixel values that require more bits to represent digitally. Both the cost of the ADC and the conversion time required to generate each pixel value increase with the number of bits. It should be noted that in a CCD array, each column of pixels is typically converted in a single conversion circuit by shifting the collected charge serially to the conversion circuit. Hence, the time to readout the image will be increased as the conversion time increases. While additional conversion circuits or high speed ADCs can be used to compensate for this increase in readout time, both of these solutions increase the cost of the imaging array.

SUMMARY OF THE INVENTION

The present invention includes an imaging array and a charge measurement amplifier for use in such imaging arrays. The imaging array includes a CCD imaging array having a plurality of pixels that accumulate charge when exposed to light, a readout amplifier, and a shift register. The readout amplifier includes an operational amplifier having an input and an output port and a variable feedback capacitor connecting the input and output ports. The variable feedback capacitor has a feedback capacitance determined by a gain control signal. The operational amplifier generates an output signal on the output port related to the feedback capacitance and a charge coupled to the input port. The readout amplifier also includes a reset path between the input and output ports, the path having an impedance controlled by a reset signal, and a controller. The controller generates the gain control signal and the reset signal during a charge measurement cycle. The controller generates the reset signal prior to a charge to be measured being transferred to the input port. The controller initially sets the feedback capacitance to a first capacitance value after generating the reset signal, and the controller changes the feedback capacitance from the first capacitance value to a second capacitance value during the charge measurement cycle if the output signal exceeds a first threshold value during the charge measurement cycle. The shift register sequentially shifts the charge accumulated by each pixel into the input port. The controller applies the reset signal prior to each charge being shifted into the input port. The controller generates an output signal indicative of the charge shifted into the input port and a gain signal indicative of the gain control signal at a predetermined time in the charge measurement cycle. In one embodiment, the variable feedback capacitor includes a network having a plurality of capacitors and a first gain switch, the gain switch shorting a first node within the network to the output port in response to the gain control signal having a first value. In one embodiment, each of the capacitors in the network is characterized by a capacitance value and the feedback capacitance has a value less than each of the capacitance values.

DETAILED DESCRIPTION OF THE PREFERRED EMBODIMENTS OF THE INVENTION

Figure 1:
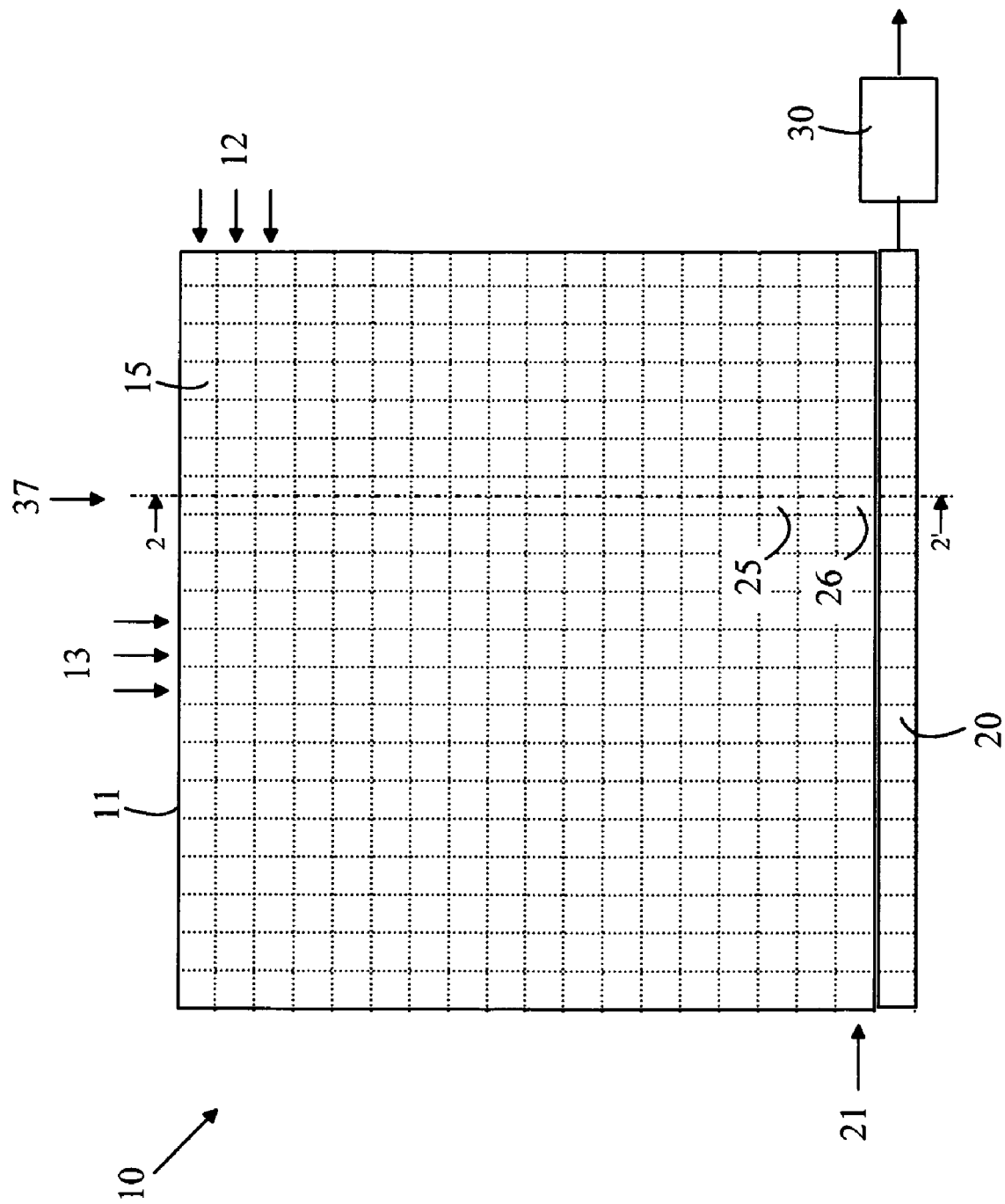
FIG. 1 illustrates a CCD imaging sensor.

The manner in which the present invention provides its advantages can be more easily understood with reference to FIG. 1, which illustrates a CCD imaging sensor. Image sensor 10 includes a photodetector array 11 in which the individual photodetectors 15 are organized as a plurality of rows 12 and columns 13. In addition, the columns can be operated as shift registers to move charge stored in the various photodetectors after the array is exposed to an image, to a shift register 20. On each single column shift operation, the contents of the photodetectors in row 21 are shifted into register 20, and the contents of each column are moved downward toward shift register 20. The contents of shift register 20 are then shifted horizontally into an output amplifier 30 that converts the charge in cell 25 to an output voltage. To simplify the drawing, the various electrodes used in the shifting operations and the clock circuitry has been omitted from FIG. 1.

Figure 2:
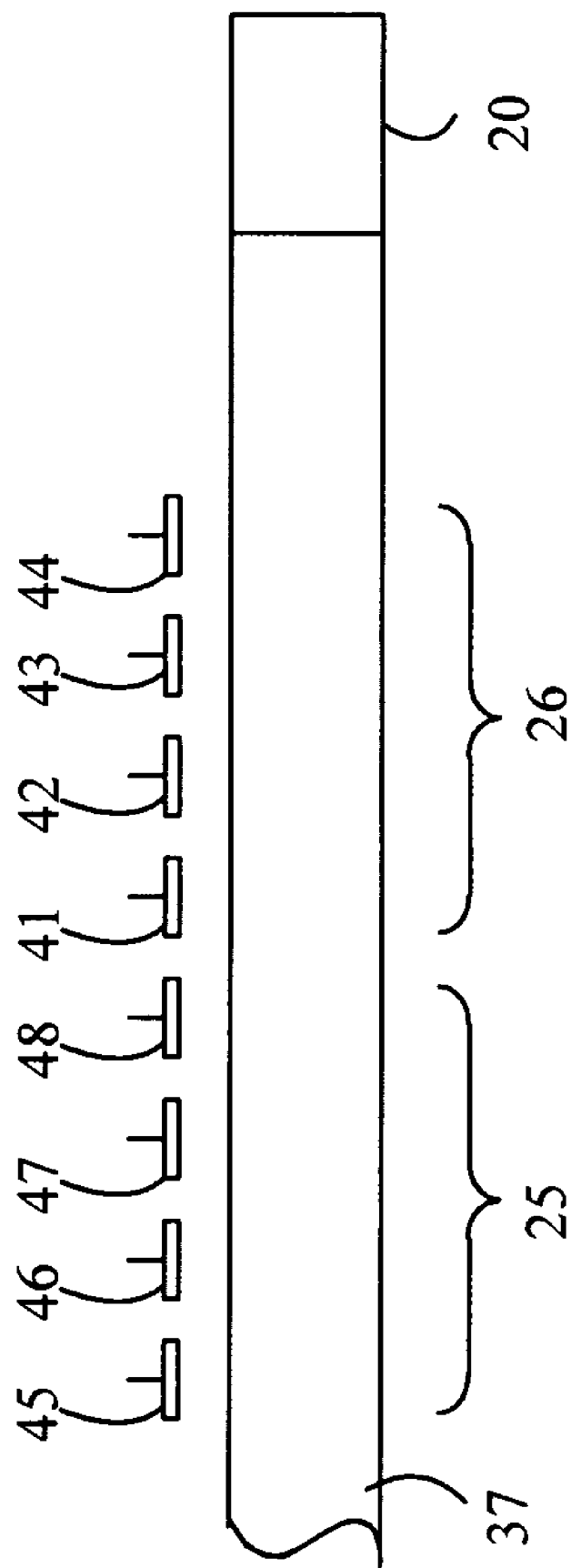
FIG. 2 is a cross-sectional view through line 2-2' shown in FIG. 1.

Refer now to FIG. 2, which is a cross-sectional view of a portion of column 37 through line 2-2' shown in FIG. 1. The portion shown in the figure includes the last two photodetectors and the electrodes associated therewith. The electrodes divide the column into the individual photodetectors by creating potential barriers at predetermined locations along the column. The position of these barriers is determined by the potentials applied to the electrodes. During the period in which the image sensor is being exposed to an image, these barriers remain fixed and the electrons generated by the interaction of the light and the column material remain trapped within the pixel areas defined by these barriers. When data is to be shifted toward shift register 20, the potentials on these electrodes is cycled in a manner that causes the charge in each pixel area to be moved into the adjacent pixel area. The charge in pixel 26 is then moved into shift register 20.

The manner in which the charge is shifted along column 37 is known to the art, and hence, will not be discussed in detail here. For the purposes of this discussion, it is sufficient to note that each pixel cell in column 37 includes an area of silicon in which the charge moves, and 4 electrodes that set the potential in the silicon area. Two such cells are shown at 25 and 26. The electrodes over the silicon of cell 26 are shown at 41-44. At the start of a shift cycle, the electrodes 41 and 44 are at potentials that contain the charge in the region under electrodes 42 and 43. To move the charge into shift register 20, the potential at electrode 42 is altered to force the charge into the region under electrode 44. The potential on electrode 44 is then altered to allow the charge to escape into a corresponding cell in shift register 20. The potential on electrodes 43 and 44 is then sequentially altered to force the charge under these electrodes to move into shift register 20.

During the shift operation, the potentials on electrodes 45-48 associated with cell 25 are likewise manipulated to force the charge in that cell into cell 26. For example, when the potential on electrode 42 is altered to force charge under that electrode to the area under electrode 43, electrode 41 is no longer needed to contain the charge within cell 26. Hence, the potential on this electrode can be altered to allow charge from cell 25 to move under electrode 41. Similarly, when the potential on electrode 43 is altered to move the charge under electrode 44, the potential on electrode 42 is no longer needed to separate the charge in cells 25 and 26, and hence this electrode's potential can be altered to allow the charge from cell 25 to move under that electrode. The potential on the electrodes in cell 25 can then be altered to force the remaining charge from cell 25 to move under electrode 42 thereby completing the shifting of the charge from cell 25 to cell 26 while the charge from cell 26 was shifted into shift register 20.

Charge is shifted along shift register 20 in an analogous manner. Each time one row in array 11 is shifted downward, shift register 20 is filled. The contents of shift register 20 are then shifted into amplifier 30, one cell at a time. The amplifier converts the charge from each cell into a corresponding voltage that is read from amplifier 30 by an output circuit. To simplify the drawings, the output circuit and the controller for operating the electrodes have been omitted from FIGS. 1 and 2. After the amplifier voltage has been recorded, the amplifier is reset, and the next cell's charge is shifted into the amplifier. When the contents of all of the cells of shift register 20 have been readout, the charges stored in the next row of pixels is shifted into shift register 20, and the process is repeated.

Figure 3:
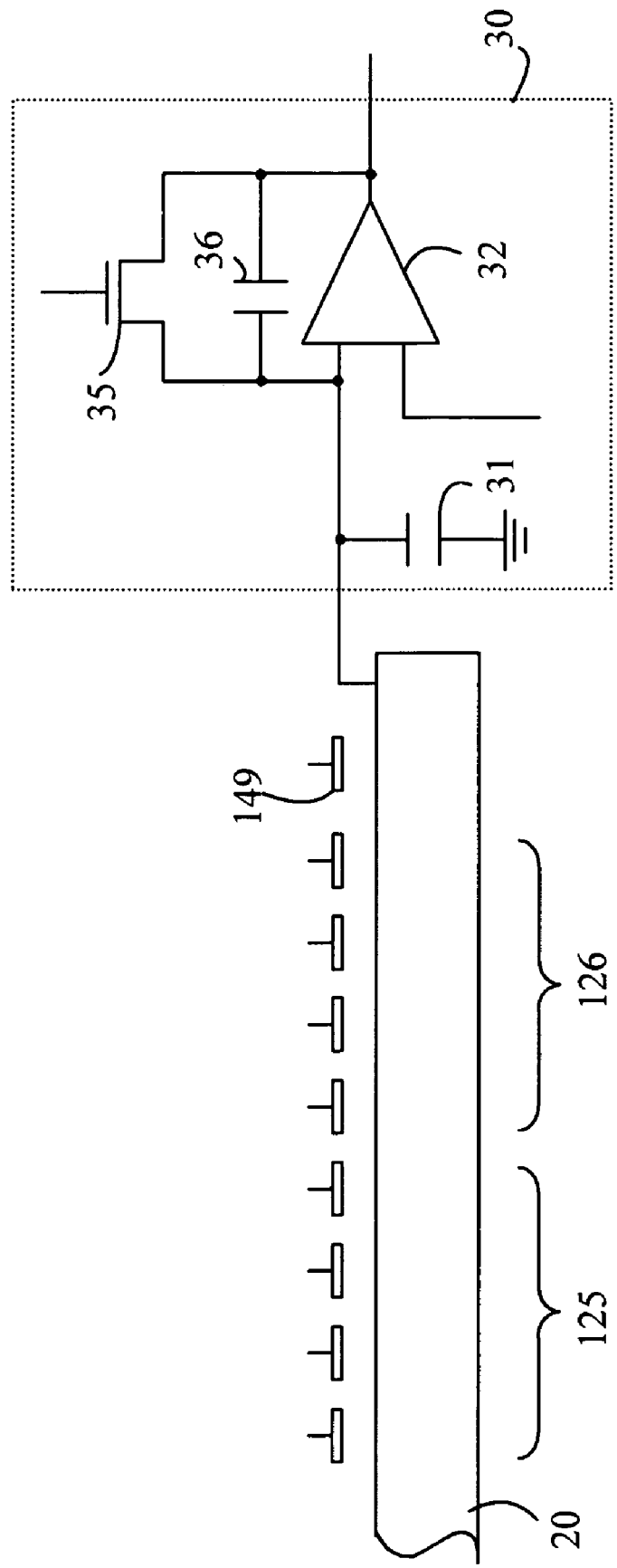
FIG. 3 is a schematic drawing of an output amplifier connected to the last two shift cells 125 and 126 in shift register 20, according to one prior art embodiment.

Refer now to FIG. 3, which is a schematic drawing of an output amplifier connected to the last two shift cells, 125 and 126, in shift register 20. Shift register 20 shifts charge from one storage cell to the next in a manner analogous to that discussed above with respect to the manner in which charge is shifted out of the various columns.

Output amplifier 30 has one capacitor 31 at the input of an operational amplifier 32 and another capacitor 36 between the input and output of the operational amplifier 32. Electrode 149 gates the charge onto capacitor 31. During readout, the charge from cell 126 will be shifted onto capacitor 31, and then onto capacitor 36 since the voltage on capacitor 31 cannot be changed due to the high gain of operational amplifier 32. After the charge is shifted onto 36, operational amplifier 32 converts the charge to a voltage value that can then be digitized to provide the intensity value corresponding to the pixel in which the charge was originally generated. Prior to the charge from cell 126 being shifted onto capacitor 31, the potential across 36 is set to a predetermined value. This is accomplished by applying a reset control signal to transistor 35, which couples the input of operational amplifier 32 to its output, which is held at the reset potential during this operation. Once the potential on capacitor 36 has been set, transistor 35 is set to the non-conducting state. When the charge from cell 126 is shifted onto capacitor 36, it alters the voltage at the output of operational amplifier 32. The conversion gain of this amplifier, which is defined as the change of output voltage divided by the input charge generally in the unit of microvolt per electron, is therefore determined by the capacitance of 36. Since capacitor 36 effectively integrates the charge deposited thereon, the summing operation for the cells in shift register 20 can be carried out by shifting the charge from each cell to be summed onto capacitor 36 after the capacitor has been reset. Once all of the charges have been shifted onto capacitor 36, the voltage at the output of operational amplifier 32 provides a measure of the sum of the charge from the cells in question.

While the capacitor 31 is shown as a discrete capacitor, it is to be understood that this capacitor is the parasitic capacitance at the input of the operational amplifier (opamp). The capacitance of this capacitor will be denoted by $C_i$ in the following discussion. The capacitance of feedback capacitor 36 will be denoted by $C_T$ in the following discussion. Output amplifier 30 also has a reset switch for shorting the input and output of the opamp prior to accumulating charge. The reset switch is typically a transistor such as transistor 35.

Variations in the measured output voltage after the capacitor is reset lead to noise in the final image. The output voltage of the opamp is given by $$V = O + GQ + N$$

Where O is the offset voltage stored on capacitor 36 after reset, Q is the charge from the pixel being measured, G is the conversion gain of the opamp as defined above, and N is the total read noise added onto the signal voltage due to the thermal noise and the 1/f noise of all the transistors that made up of the opamp. Variations in O from measurement to measurement introduce reset noise into the final image, which can be eliminated by the corrected double sampling (CDS) operation. In CDS, two voltage measurements are performed at the output of the amplifier, one right after the reset but before the charge transfer, and the other is after the charge transfer. Denote the first measurement as $V_1$, where $$V_1 = O + N_1$$

and the second measurement as $V_2$, where $$V_2 = O + GQ + N_2$$

Then the common offset voltage O can be cancelled by subtracting $V_1$ from $V_2$ as:

$$V_f = V_2 - V_1 = GQ + N_2 - N_1.$$

The read noise components in the above equation, $N_1$ and $N_2$, have zero mean and the same variance. Since they are uncorrelated from each other, the subtraction operation of CDS will double the read noise power in the final measurement of $V_f$. This read noise sets the fundamental limit in low light imaging, since it is of the same order of magnitude as the charge values being measured. This noise increases with increasing values of $C_T$. Hence, if a low conversion gain setting is employed to maintain the output voltage within the desired range for pixels that received a high light intensity, this read noise increases and corrupts the image for pixels that received a low light intensity.

The present invention avoids this problem by utilizing an amplifier that has a plurality of gain settings. In the simplest case, the amplifier has two gain settings. If the charge from the pixel is small, the amplifier gain is set to a high value by utilizing a feedback capacitor having a very small capacitance. If the charge is greater than some predetermined value, the capacitance is set to a higher value, thereby lowering the gain and preventing the saturation at the amplifier output. It should be noted that the noise problems associated with small pixel charges are much less severe for high pixel charges, and hence, the added noise does not present a problem, since the noise is small compared to the signal. The present invention makes use of the observation that the charge does not need to be known in advance.

Figure 4:
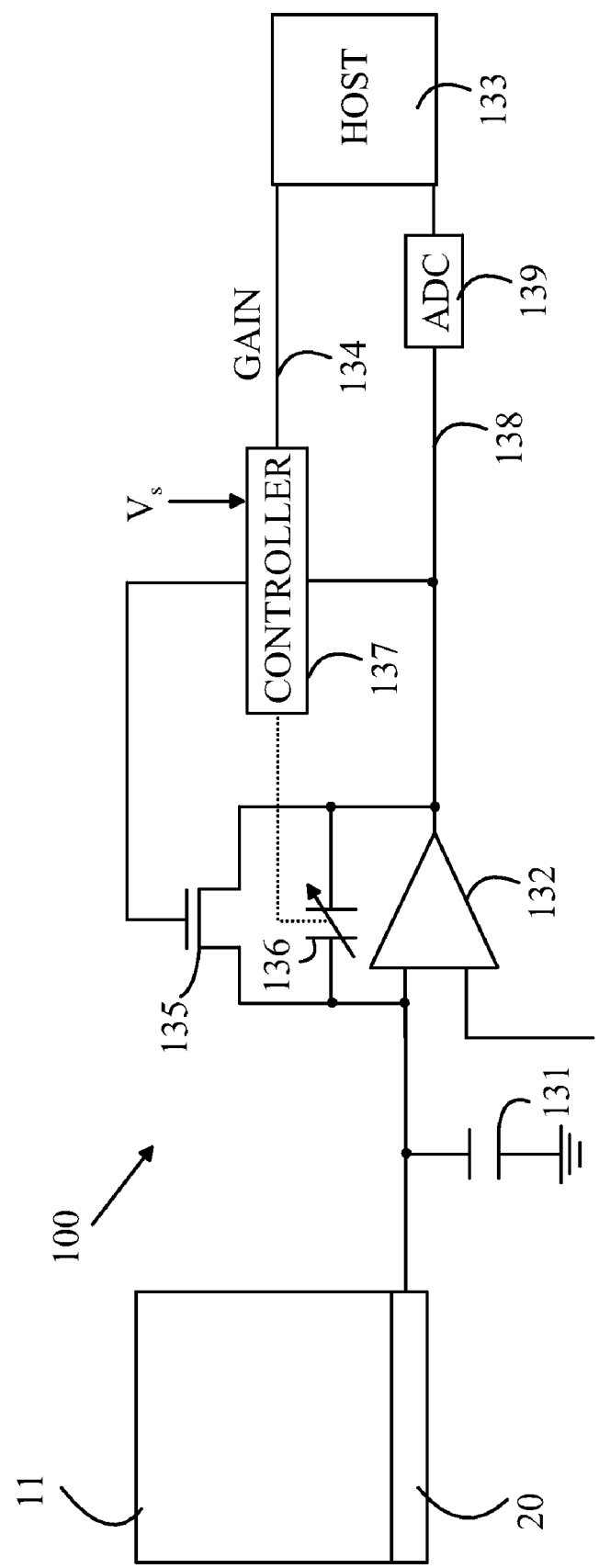
FIG. 4 illustrates a readout amplifier 100 according to one embodiment of the present invention.

Refer now to FIG. 4, which illustrates a readout amplifier 100 according to one embodiment of the present invention. Readout amplifier 100 is a transimpedance amplifier constructed from opamp 132 and a variable feedback capacitor 136. The conversion gain of readout amplifier 100 is proportional to $e/C_T$, where e is the charge of a single electron, and $C_T$ is the capacitance of variable capacitor 136. The capacitance of capacitor 136 is set by controller 137, which monitors the output voltage from opamp 132 during the readout process.

At the start of the readout process for one of the pixels, the controller resets readout amplifier 100 by shorting capacitor 136 utilizing switch 135 in a manner analogous to that discussed above. For the purposes of this discussion, it will be assumed that capacitor 136 has two capacitance values. At the start of the process, the capacitance of capacitor 136 is set to the lower capacitance value, and hence, the gain of readout amplifier 100 starts out at the highest value. Controller 137 monitors the output of opamp 132 as the output value rises after the charge to be measured is shifted onto capacitor 131. If the output voltage detected by controller 137 exceeds a predetermined value Vs, controller 137 switches the capacitance of capacitor 136 to the higher capacitance value, thereby lowering the gain of the readout amplifier. After the output voltage on line 138 stabilizes, the output voltage is digitized by ADC 139. The digitized value together with a one bit signal on line 134 that represents the final gain setting are then provided to a host data processing system 133 as the output for the pixel in question. The host data processing system includes the necessary calibration information for converting the output value and gain setting to a digital value that determines the charge collected by the pixel in question.

The above-described embodiment of the present invention utilizes a variable capacitor with two capacitance values to provide two gain settings. However, more generalized embodiments that utilize three or more gain setting by switching between three or more capacitance values can also be constructed in an analogous manner. In such systems, controller 137 switches gain settings each time the output voltage exceeds a predetermined threshold voltage associated with the current gain setting. Controller 137 then outputs a multi-bit gain value to the host so that the host can compute the charge transferred to capacitor 131 during the pixel readout operation.

As noted above, the conversion gain of the transimpedance amplifier is proportional to $e/C_T$. Hence, to provide the high gain needed for small pixel charges, $C_T$ must be very small. Unfortunately, there is a limit to the minimum size of a capacitor constructed by conventional photolithographic methods. Hence, the present invention preferably utilizes a variable capacitor that is a network of capacitors constructed from capacitors that are large enough to be reproducibly fabricated. In the highest gain setting, the effective capacitance of the network is less than the capacitance of any single capacitor in the network; hence, a low total capacitance value can be achieved without using capacitors that are not readily fabricated using conventional IC fabrication techniques.

Figure 5:
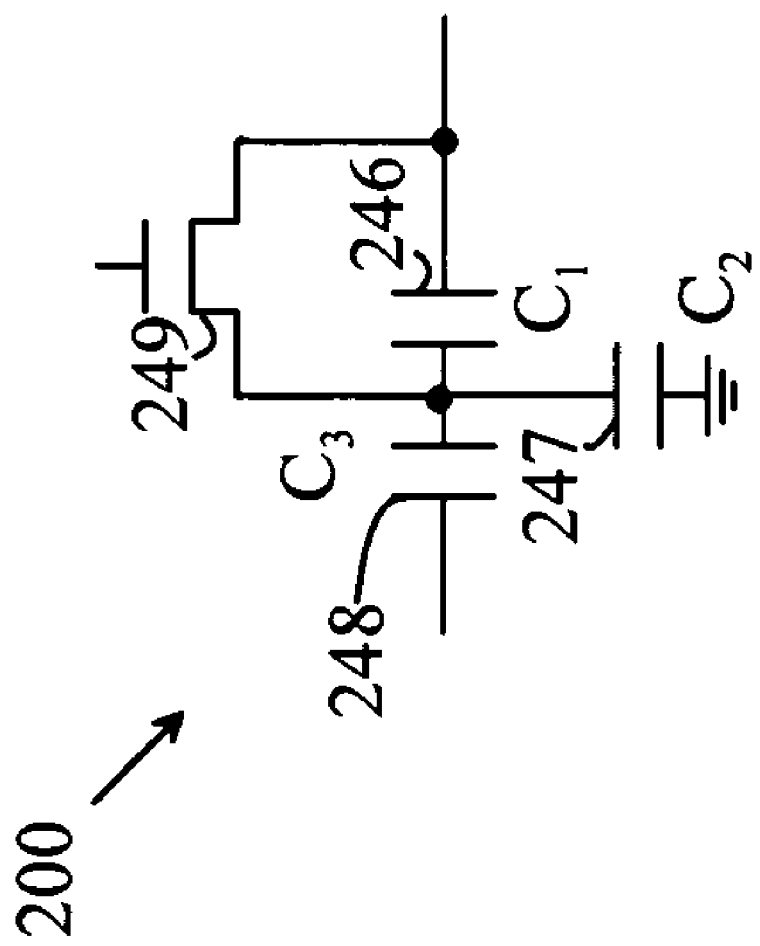
FIG. 5 is a schematic drawing of a capacitive network according to one embodiment of the present invention.

Refer now to FIG. 5, which is a schematic drawing of a capacitive network 200 consisting of capacitors 246-248 whose capacitances will be denoted by $C_1$-$C_3$, respectively, in the following discussion. Gain switch 249 is operated in conjunction with switch 135 shown in FIG. 4 to short the capacitors prior to transferring charge to Ci. When gain switch 249 is in the open position, the equivalent capacitance of the network is $C_3C_1/(C_1+C_2+C_3)$. Hence, if $C_3$ and $C_1$ are about the same size as $C_1$, i.e., $C_1=C_3=C_i$ and $C_2=G*C_i$, where $G>>1$, the resulting network will have a capacitance that is approximately $C_i/G$. When gain switch 249 is closed, the capacitance of the network equals $C_3$. Hence, by closing the gain switch during the measurement phase, the gain is shifted from a high gain setting to a low gain setting.

Figure 6:
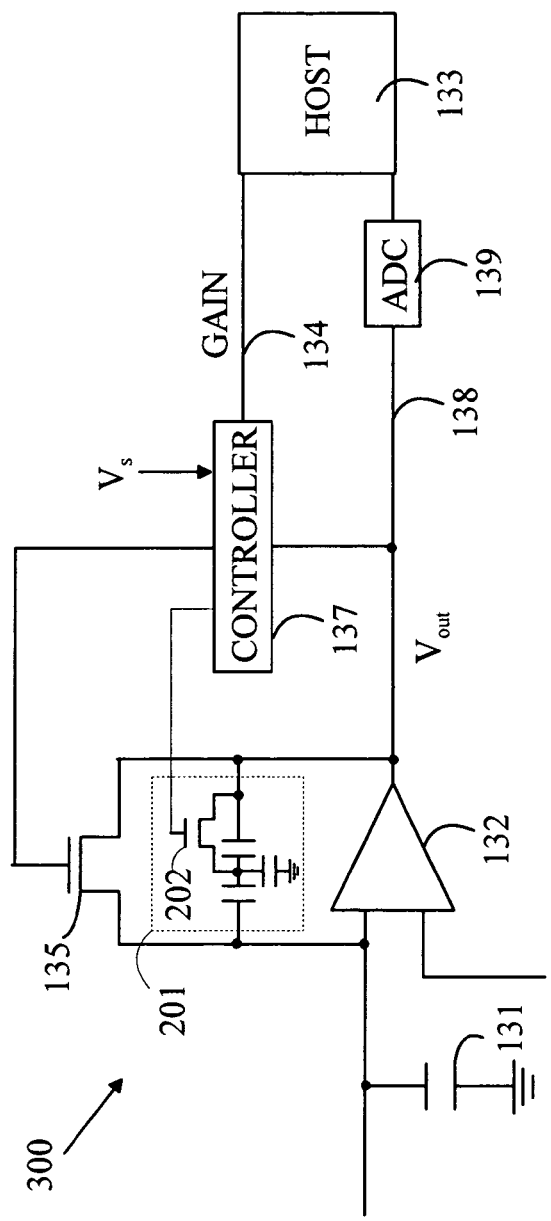
FIG. 6 is a schematic drawing of a readout amplifier 300.
Figure 7:
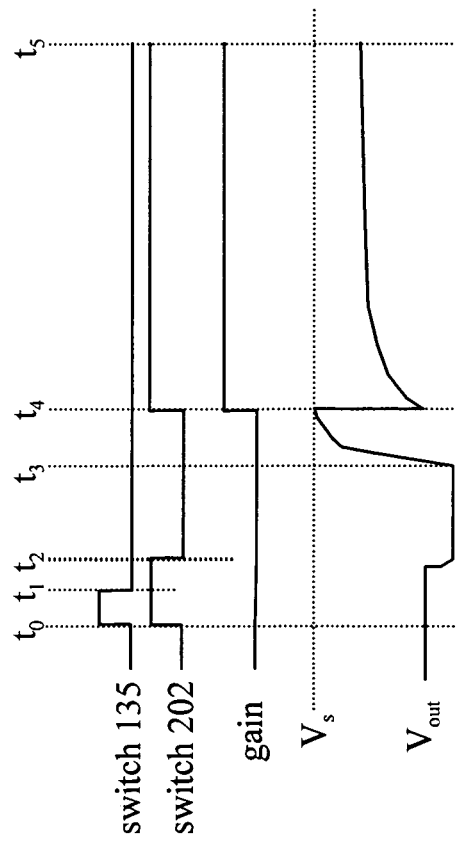
FIG. 7 illustrates the waveforms at four points in readout amplifier 300 during the readout of a large charge that utilizes the low gain setting.

Refer now to FIGS. 6 and 7, which illustrate an embodiment of the present invention that utilizes the three-capacitor network shown in FIG. 5. FIG. 6 is a schematic drawing of a readout amplifier 300, and FIG. 7 illustrates the waveforms at four points in readout amplifier 300 during the readout of a large charge, i.e., a charge that will utilize the low gain setting. To simplify the following discussion, those elements of readout amplifier 300 that serve functions analogous to elements discussed above with reference to readout amplifier 100 have been given the same numeric designations and will not be discussed further here. At the start of a readout cycle, i.e., t0, switches 135 and 202 are closed to reset the voltage at the input to opamp 132. Switch 135 is preferably opened before switch 202, as shown at $t_1$ and $t_2$. The gain bit is also set to 0 during the reset operation. The charge to be measured is switched onto capacitor 131 at $t_3$, and the output voltage, $V_{out}$, increases until the output voltage reaches $V_s$ at $t_4$. At this point, controller 137 closes switch 202, which switches the gain to the low gain setting. Controller 137 also sets the gain bit to a "1" indicating that the low gain setting is being used. At $t_5$, the data is ready for processing by the ADC 139 and host 133.

Figure 8:
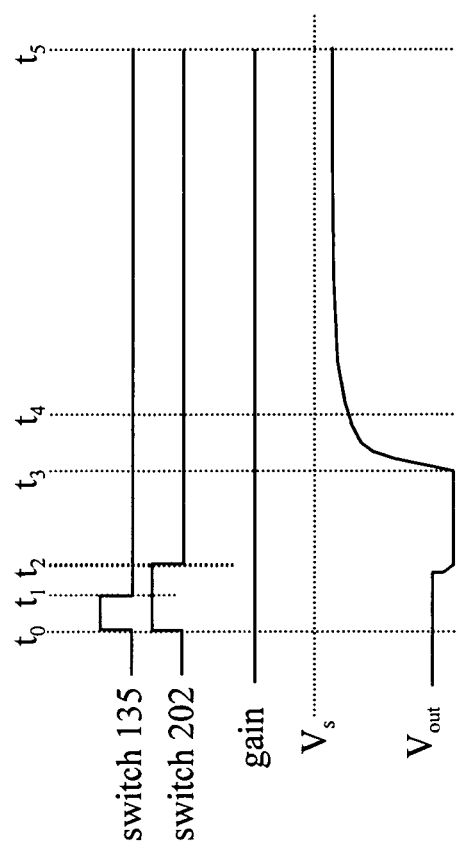
FIG. 8 illustrates the waveforms shown in FIG. 7 for the case in which the charge to be measured is small and the output voltage never reaches $V_s$.

Refer now to FIG. 8, which illustrates the waveforms shown in FIG. 7 for the case in which the charge to be measured is small, and hence, the output voltage never reaches $V_s$. In this case, the gain bit remains at 0 and switch 202 remains open during the charge measurement cycle.

Figure 9:
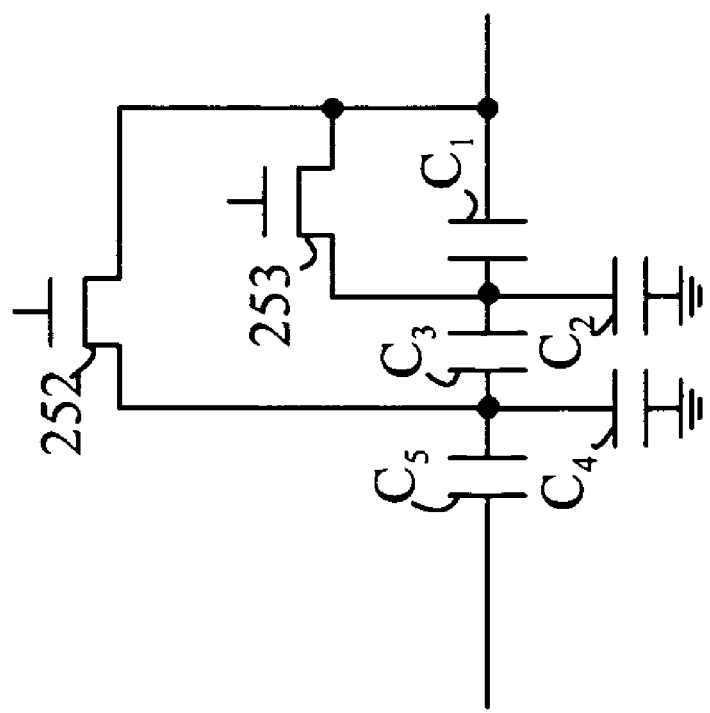
FIG. 9 is a schematic drawing of a capacitor network with five capacitors and two switches.

The above-described embodiment utilizes a three-capacitor network with one switch to implement a readout amplifier having two gain settings. However, capacitor network based embodiments that provide more gain settings can also be constructed. Refer now to FIG. 9, which is a schematic drawing of a capacitor network 250 with five capacitors and two switches. Capacitor network 250 can be incorporated in the readout amplifier design shown in FIG. 7 in place of network 201. During the reset operation, switches 252 and 253 are closed. During the charge measurement operation, switches 252 and 253 are initially set to the open state. If the output voltage exceeds the voltage threshold, Vs, and switch 253 is open, then switch 253 is closed to reduce the gain. If switch 253 is already closed, then switch 252 is closed to reduce the gain further. In this case, a two-bit gain output signal is utilized to indicate the final gain used to provide the output voltage that is digitized.

In principle, capacitor networks that provide even more gain settings can be constructed in a manner analogous to that described above. In addition, variable capacitors can be constructed from other network arrangements. In addition, embodiments that utilize other forms of variable gain amplifiers can also be constructed. However, it should be noted that the conversion gain in these amplifiers will in general depend on the capacitance of a capacitor that sets the charge to voltage conversion, and hence, the present invention can be applied to those systems independent of the amplifier implementation.

The above-described embodiments of the present invention assume that any variation in the reset potential between samples is negligible. In practice, the voltage across capacitor 131 shown in FIG. 4 varies somewhat from sample to sample due to noise at the output of opamp 132. This reset voltage error gives rise to an error in the charge measurement, since the amplifier's output is altered by the charge on the capacitor prior to the unknown charge being transferred to capacitor 131. This gives rise to "reset noise". If the charge being measured is large, this reset noise is negligible. However, if the charge is small, the measurements must be corrected for the reset noise, as the charge represented by this reset error can be of the same order of magnitude as the charge that is to be measured.

Figure 10:
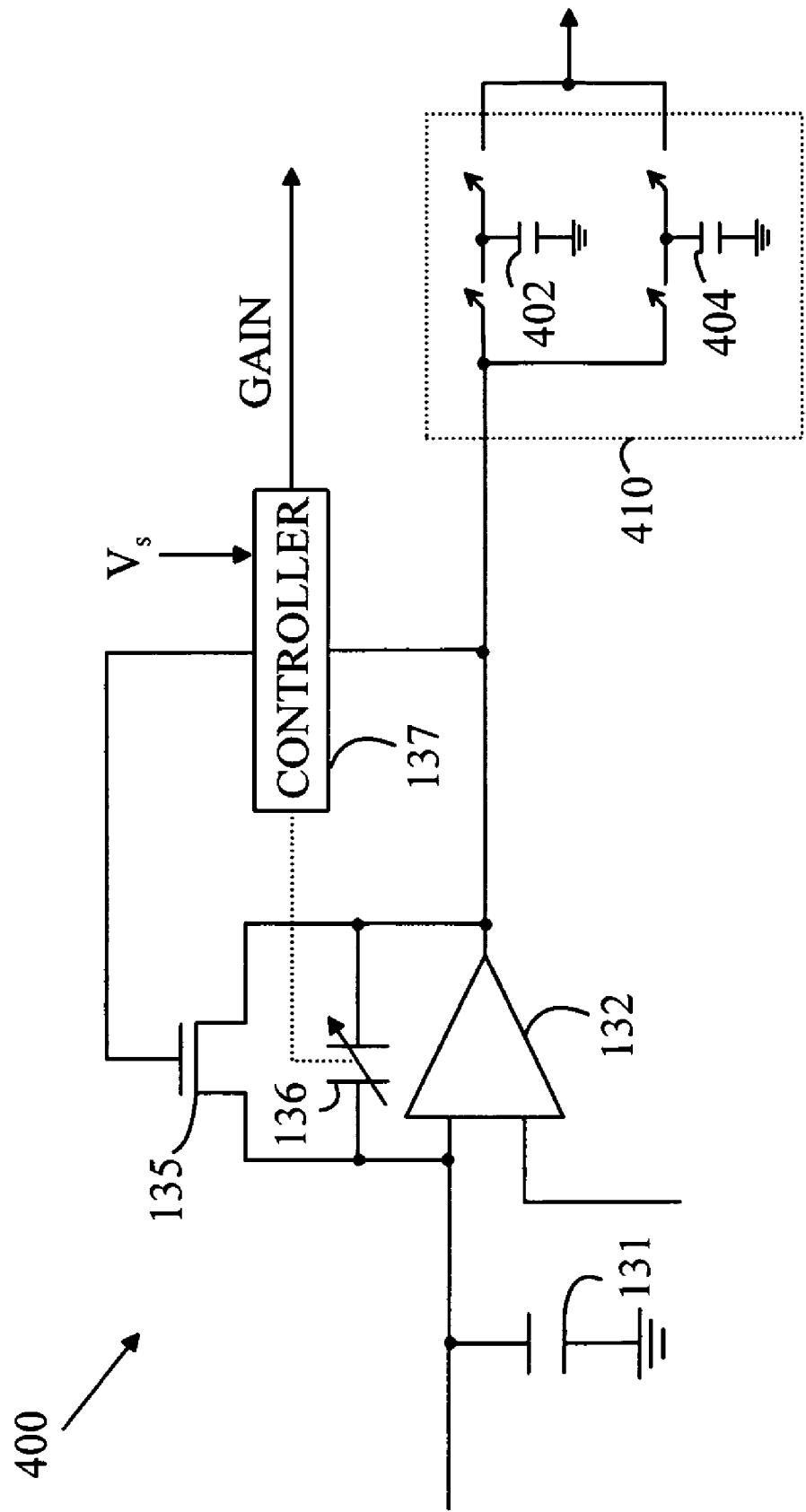
FIG. 10 is a block diagram of a readout amplifier according to another embodiment of the present invention.

Refer now to FIG. 10, which is a block diagram of a readout amplifier according to another embodiment of the present invention. To simplify the following discussion, those elements of readout amplifier 400 that serve functions analogous to elements discussed above with reference to readout amplifier 100 have been given the same numeric designations and will not be discussed further here. Readout amplifier 400 utilizes a sample and hold circuit 410 to store the output voltages from opamp 132 at the beginning and end of the readout cycle. The various switches within sample and hold circuit 410 are operated by controller 137. To simplify the drawing, the control connections between these switches and the controller have been omitted. The two voltages that are stored in sample and hold circuit 410 are output to a host device that subtracts the two voltages either before or after the voltages are digitized. The subtraction operation effectively cancels the reset noise in the case that the charge being measured is small and the conversion is performed at the high gain setting. It should be noted that if the voltages are digitized prior to being subtracted, the reset voltage that is stored on capacitor 402 can be readout and digitized by the host while the charge measurement is being made and stored on capacitor 404.

Various modifications to the present invention will become apparent to those skilled in the art from the foregoing description and accompanying drawings. Accordingly, the present invention is to be limited solely by the scope of the following claims.

What is claimed is:

1. An amplifier comprising:
an operational amplifier having an input and an output port and a variable feedback capacitor connecting said input and output ports, said variable feedback capacitor having a feedback capacitance determined by a gain control signal, said operational amplifier generating an output signal on said output port related to said feedback capacitance and a charge coupled to said input port;
a reset path between said input and output ports, said path having an impedance controlled by a reset signal; and
a controller that generates said gain control signal and said reset signal during a charge measurement cycle, said controller generating said reset signal prior to a charge to be measured being transferred to said input port, said controller initially setting said feedback capacitance to a first capacitance value after generating said reset signal, and said controller changing said feedback capacitance from said first capacitance value to a second capacitance value during said charge measurement cycle if said output signal exceeds a first threshold value said amplifier coupling an analog signal from said output port to a circuit external to said amplifier at the end of said charge measurement cycle.

2. The amplifier of claim 1 wherein said first capacitance value is less than said second capacitance value.

3. The amplifier of claim 1 wherein said variable feedback capacitor comprises a network having a plurality of capacitors and a first gain switch, said gain switch shorting a first node within said network to said output port in response to said gain control signal having a first value.

4. The amplifier of claim 3 wherein said variable feedback capacitor further comprises a plurality of capacitors and a second gain switch, said second gain switch shorting a second node within said network to said output port in response to said gain control signal having a second value, said second node being different from said first node.

5. An amplifier comprising:

an operational amplifier having an input and an output port and a variable feedback capacitor connecting said input and output ports, said variable feedback capacitor having a feedback capacitance determined by a gain control signal, said operational amplifier generating an output signal on said output port related to said feedback capacitance and a charge coupled to said input port;

a reset path between said input and output ports, said path having an impedance controlled by a reset signal; and a controller that generates said gain control signal and said reset signal during a charge measurement cycle, said controller generating said reset signal prior to a charge to be measured being transferred to said input port, said controller initially setting said feedback capacitance to a first capacitance value after generating said reset signal, and said controller changing said feedback capacitance from said first capacitance value to a second capacitance value during said charge measurement cycle if said output signal exceeds a first threshold value;

wherein said variable feedback capacitor comprises a network having a plurality of capacitors;

wherein each of said capacitors in said network is characterized by a capacitance value and where said first feedback capacitance has a value less than each of said capacitance values.

6. An amplifier comprising:

an operational amplifier having an input and an output port and a variable feedback capacitor connecting said input and output ports, said variable feedback capacitor having a feedback capacitance determined by a gain control signal, said operational amplifier generating an output signal on said output port related to said feedback capacitance and a charge coupled to said input port;

a reset path between said input and output ports, said path having an impedance controlled by a reset signal;

a controller that generates said gain control signal and said reset signal during a charge measurement cycle, said controller generating said reset signal prior to a charge to be measured being transferred to said input port, said controller initially setting said feedback capacitance to a first capacitance value after generating said reset signal, and said controller changing said feedback capacitance from said first capacitance value to a second capacitance value during said charge measurement cycle if said output signal exceeds a first threshold value; and a sample and hold circuit for storing the voltage on said output port after said reset signal has been generated but before said charge is transferred.

7. A method for measuring a charge accumulated on a photodetector, said method comprising:

transferring said charge to a capacitor connected to the input port of an operational amplifier having a variable gain, said variable gain being set to a first value when said charge is transferred;

monitoring an output voltage on said output port;

changing said gain to a second value if said output value exceeds a threshold value;

outputting an analog signal related to said output voltage after said output voltage has stabilized and a signal specifying said gain value at the time said output voltage had stabilized and digitizing said analog signal to obtain a digitized signal value and combining said digitized value with said gain value to provide a measure of said charge.

8. The method of claim 7 wherein said amplifier comprises an operational amplifier having a feedback capacitor connected between said input and output ports, and wherein said gain is changed by changing said feedback capacitance from a first capacitance value to a second capacitance value.

9. A method for measuring a charge comprising:

transferring said charge to a capacitor connected to the input port of an operational amplifier having a variable gain, said variable gain being set to a first value when said charge is transferred;

monitoring an output voltage on said output port; and changing said gain to a second value if said output value exceeds a threshold value;

outputting a signal related to said output voltage after said output voltage has stabilized and a signal specifying said gain value at the time said output voltage had stabilized; and storing a value related to said output voltage prior to said transfer of said charge to said input port and outputting said stored value.

10. An imaging array comprising:

a CCD imaging array comprising a plurality of pixels that accumulate charge when exposed to light;

a readout amplifier comprising:

an operational amplifier having an input and an output port and a variable feedback capacitor connecting said input and output ports, said variable feedback capacitor having a feedback capacitance determined by a gain control signal, said operational amplifier generating an output signal on said output port related to said feedback capacitance and a charge coupled to said input port;

a reset path between said input and output ports, said path having an impedance controlled by a reset signal; and a controller that generates said gain control signal and said reset signal during a charge measurement cycle, said controller generating said reset signal prior to a charge to be measured being transferred to said input port, said controller initially setting said feedback capacitance to a first capacitance value after generating said reset signal, and said controller changing said feedback capacitance from said first capacitance value to a second capacitance value during said charge measurement cycle if said output signal exceeds a first threshold value; and a shift register that sequentially shifts said charge accumulated by each pixel into said input port, said controller applying said reset signal prior to each charge being shifted into said input port, wherein said controller generates an output indicative of said charge shifted into said input port and a gain signal indicative of said gain control signal at a predetermined time in said charge measurement cycle.

11. The imaging array of claim 10 wherein said first capacitance value is less than said second capacitance value.

12. The imaging array of claim 10 wherein said variable feedback capacitor comprises a network having a plurality of capacitors and a first gain switch, said gain switch shorting a first node within said network to said output port in response to said gain control signal having a first value.

13. The imaging array of claim 12 wherein each of said capacitors in said network is characterized by a capacitance value and where said feedback capacitance has a value less than each of said capacitance values.

14. The imaging array of claim 12 wherein said variable feedback capacitor further comprises a plurality of capacitors and a second gain switch, said second gain switch shorting a second node within said network to said output port in response to said gain control signal having a second value, said second node being different from said first node.

15. The imaging array of claim 10 further comprising a sample and hold circuit for storing the voltage on said output port after said reset signal has been generated but before said charge is transferred.

* * * * *